United States Patent
Lee et al.

(10) Patent No.: US 8,151,156 B2
(45) Date of Patent: Apr. 3, 2012

(54) REPETITIVE TRANSMISSIONS IN MULTI-CARRIER BASED WIRELESS ACCESS TECHNIQUES

(75) Inventors: Moon-Il Lee, Gyeonggi-Do (KR); Jin-Young Chun, Seoul (KR); Jae-Won Chang, Gyeonggi-Do (KR); Jin-Hyuk Jung, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 792 days.

(21) Appl. No.: 12/296,667

(22) PCT Filed: Apr. 6, 2007

(86) PCT No.: PCT/KR2007/001704
§ 371 (c)(1), (2), (4) Date: Oct. 9, 2008

(87) PCT Pub. No.: WO2007/117100
PCT Pub. Date: Oct. 18, 2007

(65) Prior Publication Data
US 2009/0276672 A1 Nov. 5, 2009

Related U.S. Application Data

(60) Provisional application No. 60/790,972, filed on Apr. 10, 2006.

(30) Foreign Application Priority Data

Jul. 10, 2006 (KR) .................. 10-2006-0064452

(51) Int. Cl.
*H04L 1/18* (2006.01)

(52) U.S. Cl. ........................................ 714/749
(58) Field of Classification Search .............. 714/748, 714/749

See application file for complete search history.

(56) References Cited

U.S. PATENT DOCUMENTS

| | | | |
|---|---|---|---|
| 4,893,248 A * | 1/1990 | Pitts et al. ............ | 705/400 |
| 6,842,487 B1 | 1/2005 | Larsson | |
| 2005/0265477 A1* | 12/2005 | Takeda et al. .......... | 375/299 |
| 2007/0041457 A1* | 2/2007 | Kadous et al. ......... | 375/260 |
| 2007/0041464 A1* | 2/2007 | Kim et al. ............. | 375/267 |
| 2008/0229168 A1* | 9/2008 | Murakami et al. ..... | 714/751 |

FOREIGN PATENT DOCUMENTS

EP 1605607 12/2005
(Continued)

OTHER PUBLICATIONS

NTT DoCoMo, "Multi-Degree Cyclic Delay Diversity with Frequency-domain Channel Dependent Scheduling", 3GPP TSG-RAN WG1 Meeting #44bis, R1-060991, Mar. 2006.

*Primary Examiner* — James C Kerveros
(74) *Attorney, Agent, or Firm* — Lee, Hong, Degerman, Kang & Waimey

(57) ABSTRACT

Repetitive transmissions in multi-carrier based wireless access techniques may be achieved by providing multiple cyclic delay values for a plurality of carriers, performing a cyclic delay procedure using the multiple cyclic delay values according to the number of repetitive transmission of data symbols to be transmitted to a receiver, and transmitting the cyclic delayed data symbols to the receiver using the plurality of carriers.

15 Claims, 8 Drawing Sheets

FOREIGN PATENT DOCUMENTS

| | | |
|---|---|---|
| JP | 2003101520 | 4/2003 |
| JP | 2003152680 | 5/2003 |
| JP | 2005341317 | 12/2005 |
| WO | 2003/092213 | 11/2003 |
| WO | 2005/043854 | 5/2005 |
| WO | 2005050885 | 6/2005 |
| WO | 2006057195 | 6/2006 |

* cited by examiner

[Fig. 1]
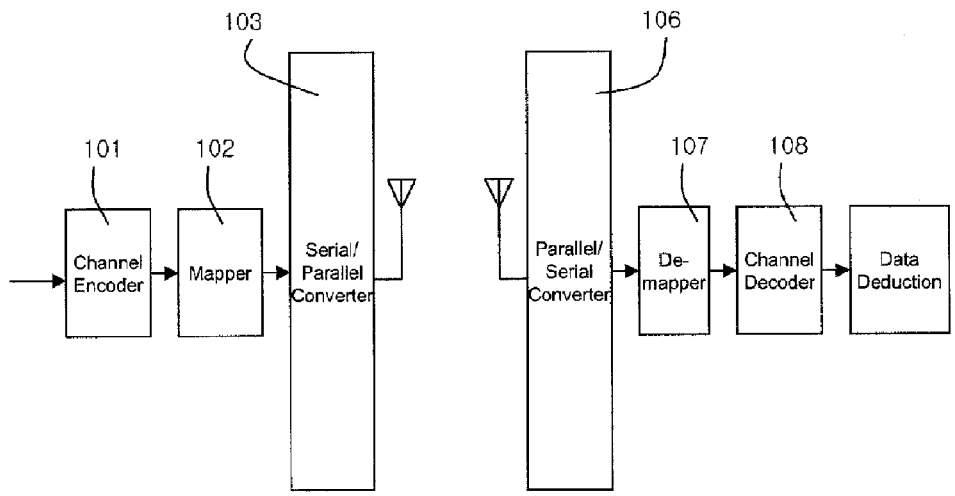
[Fig. 2]
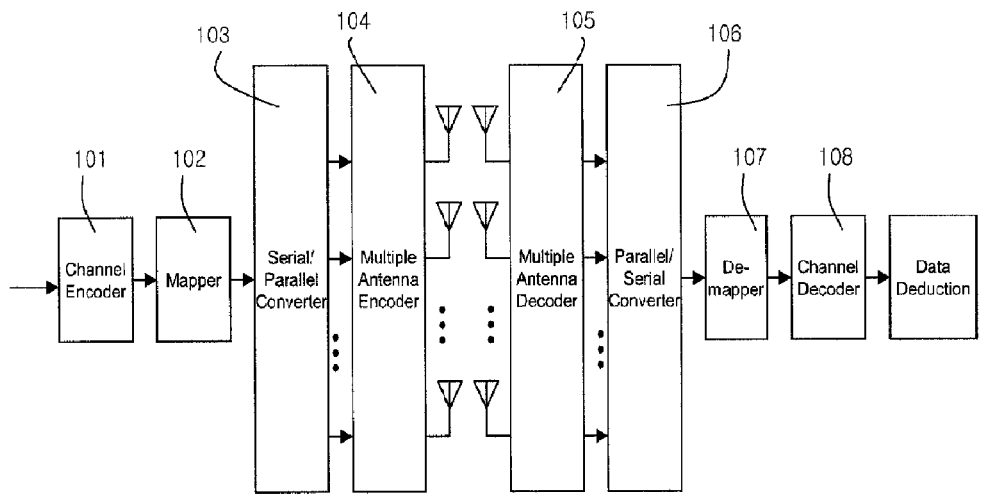
[Fig. 3]
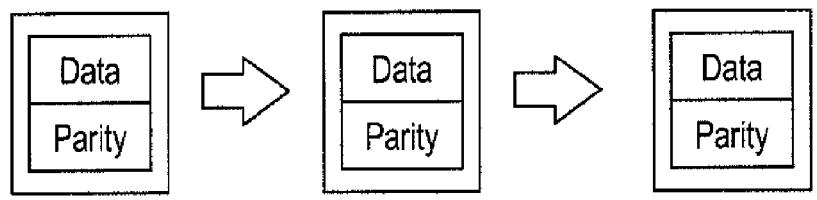

[Fig. 4]
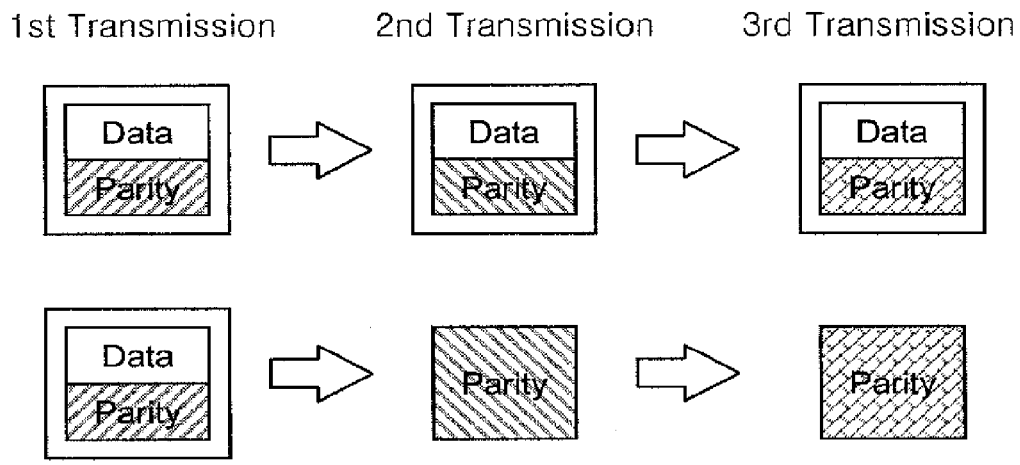
[Fig. 5]
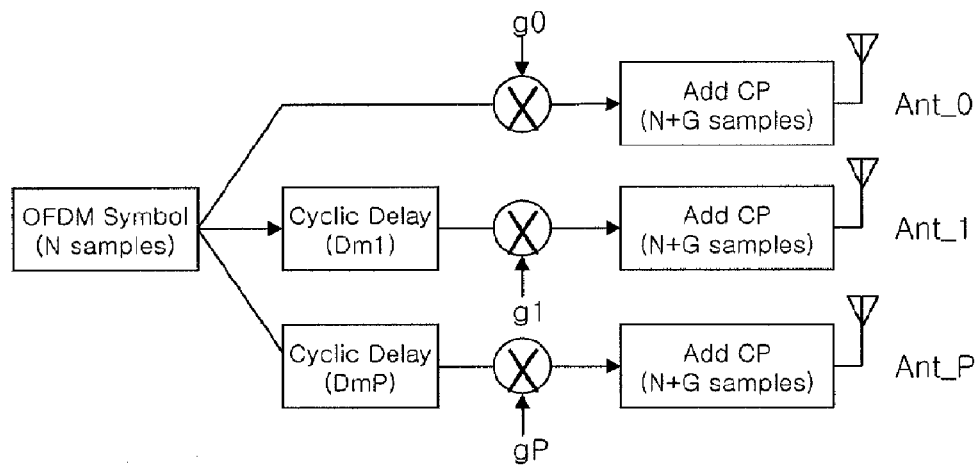
[Fig. 6]
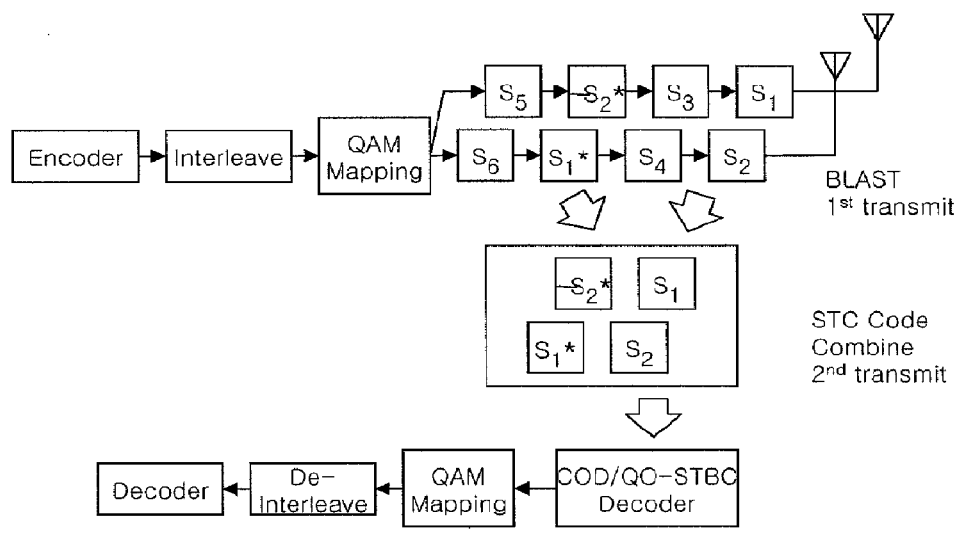

[Fig. 7]
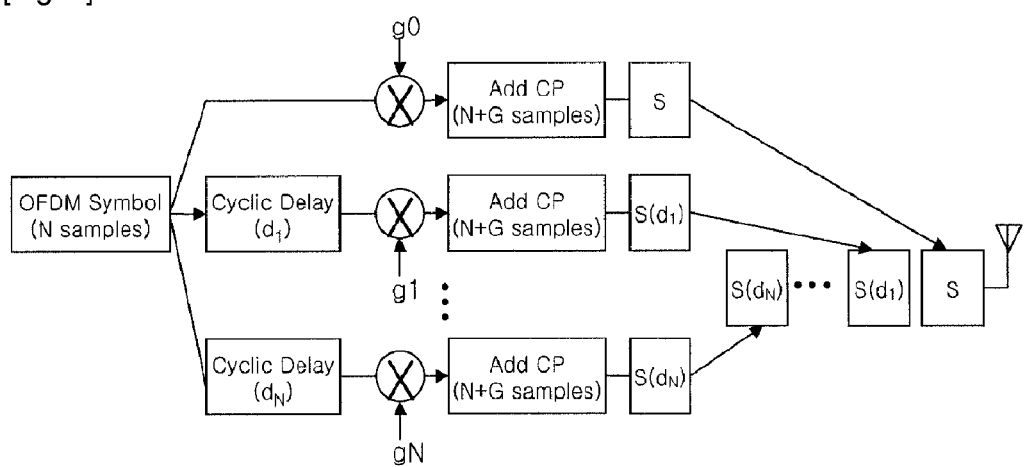
[Fig. 8]
1st Transmission     1st Re-transmission     Nth Re-transmission
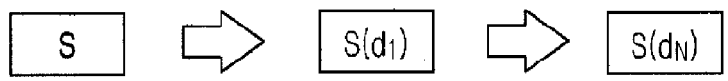

[Fig. 9]
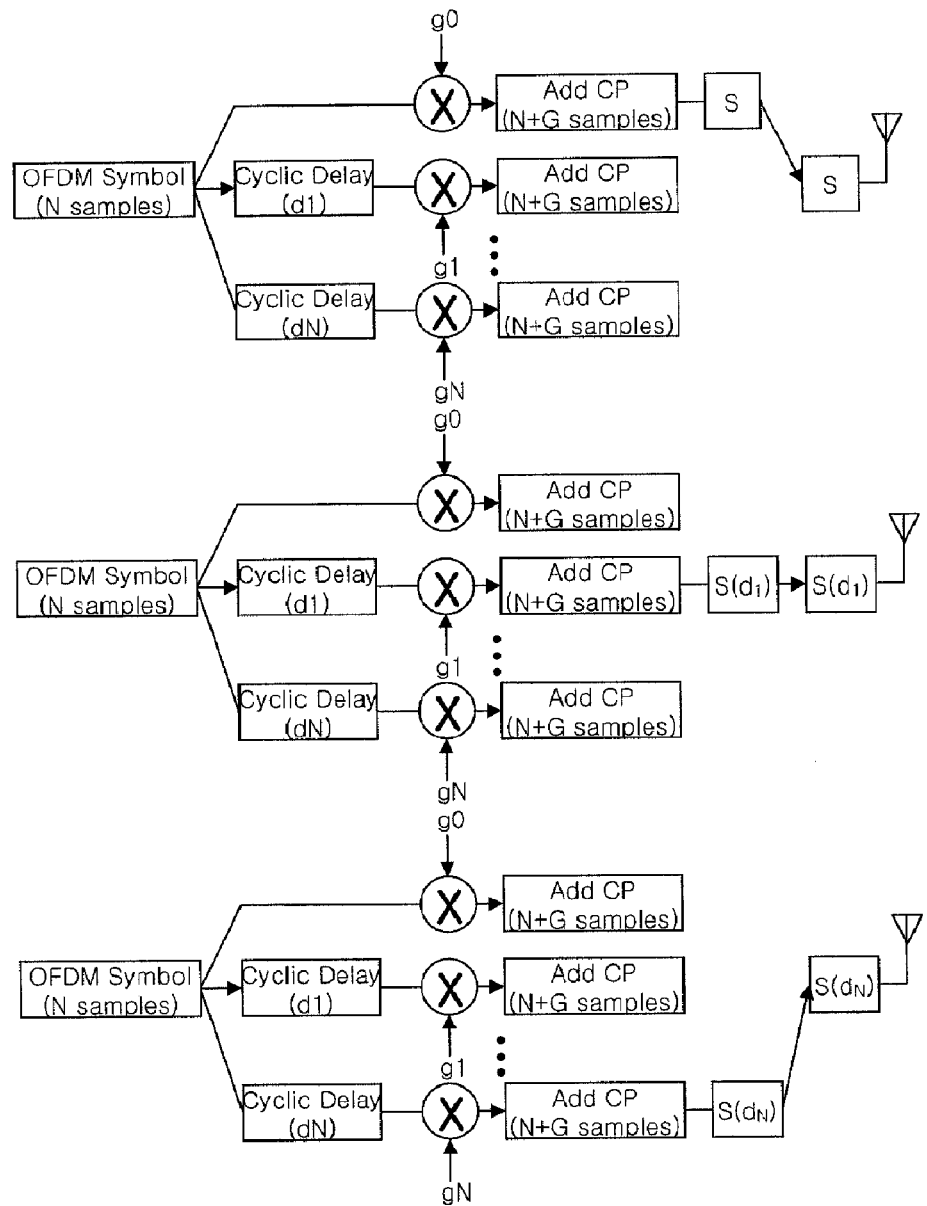
[Fig. 10]
2nd Re-transmission    1st Re-transmission    1st Transmission
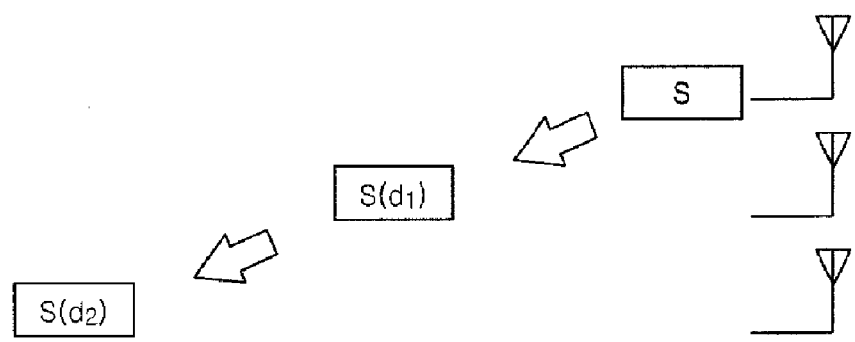

[Fig. 11]
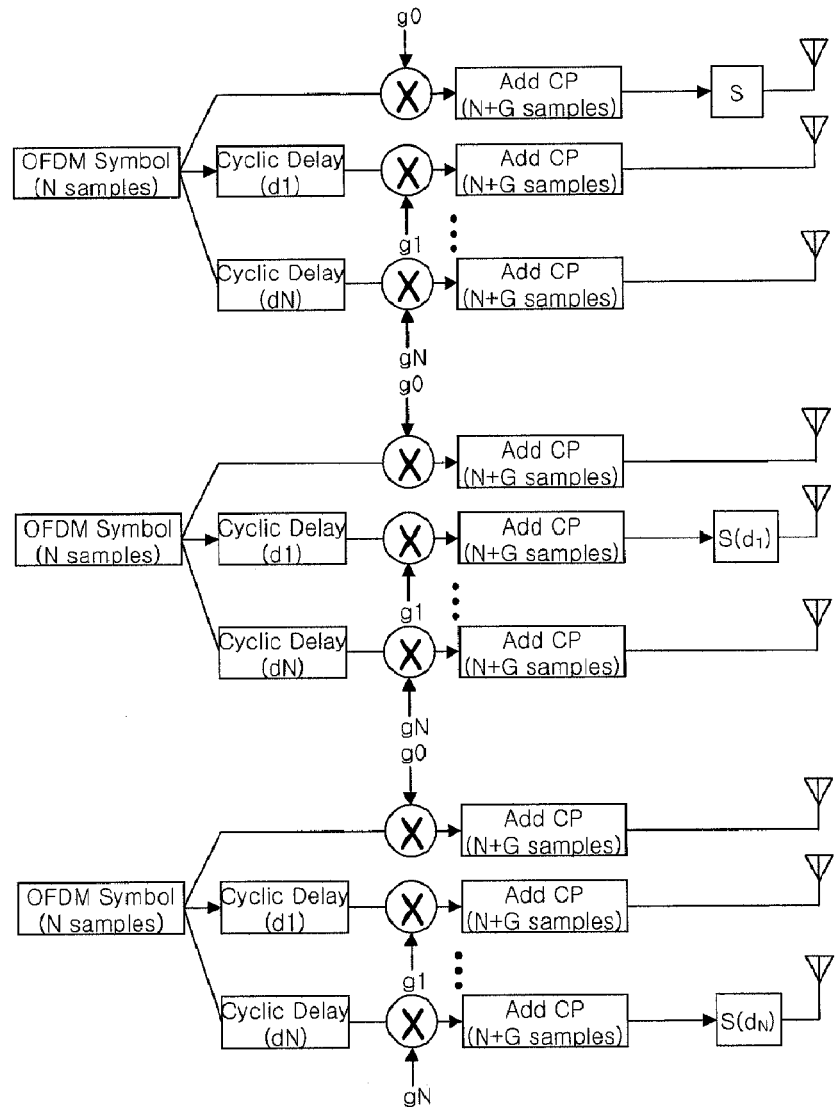
[Fig. 12]
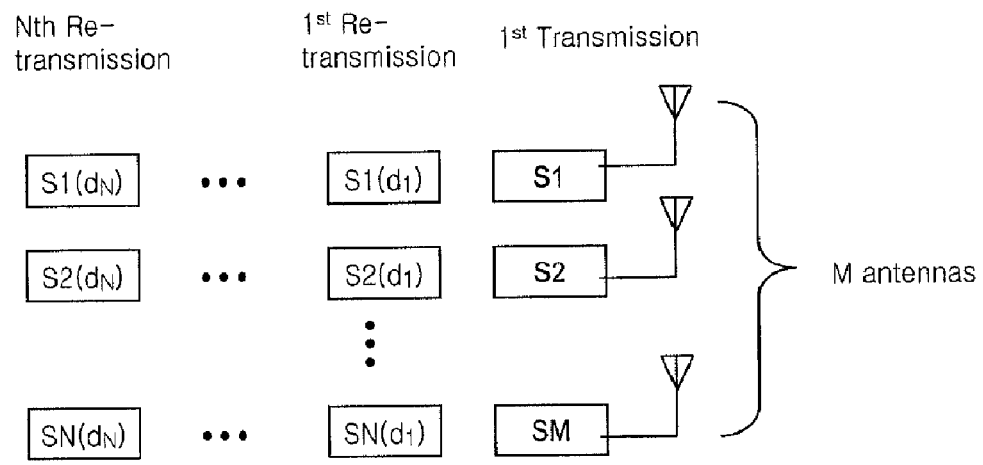

[Fig. 13]
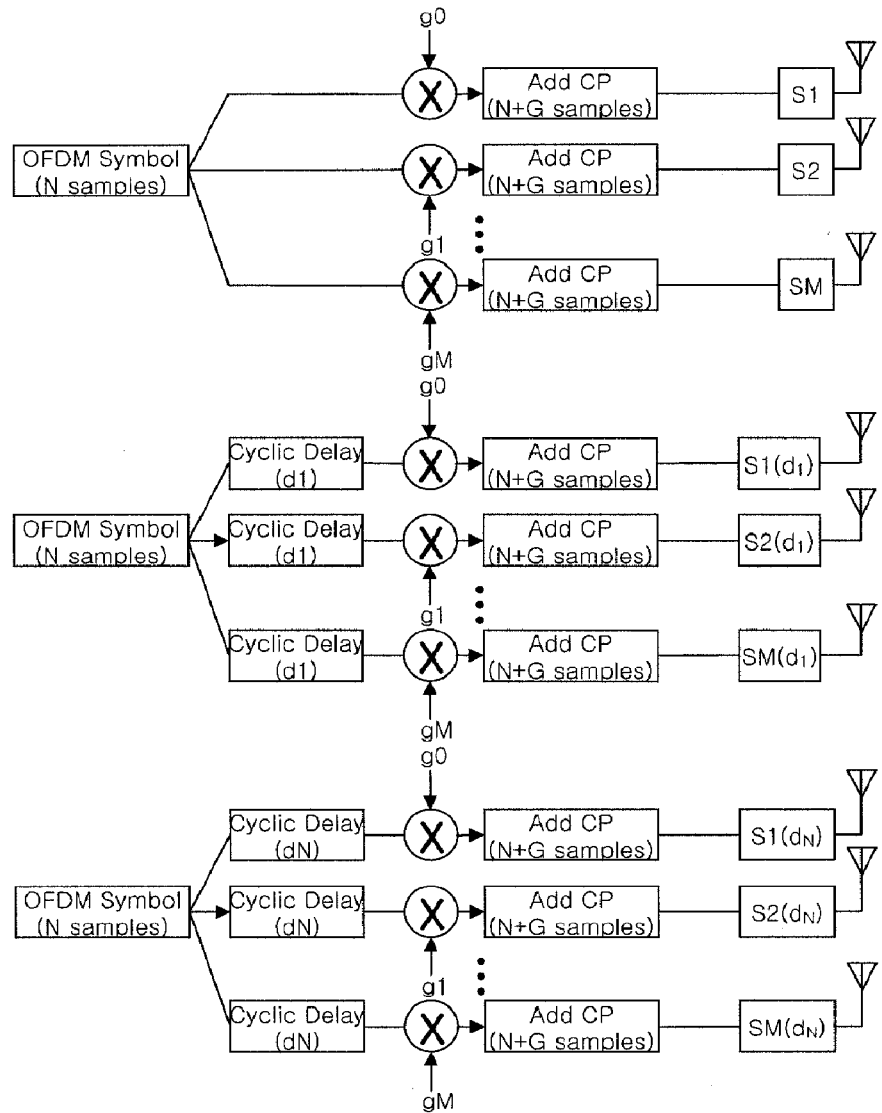
[Fig. 14]
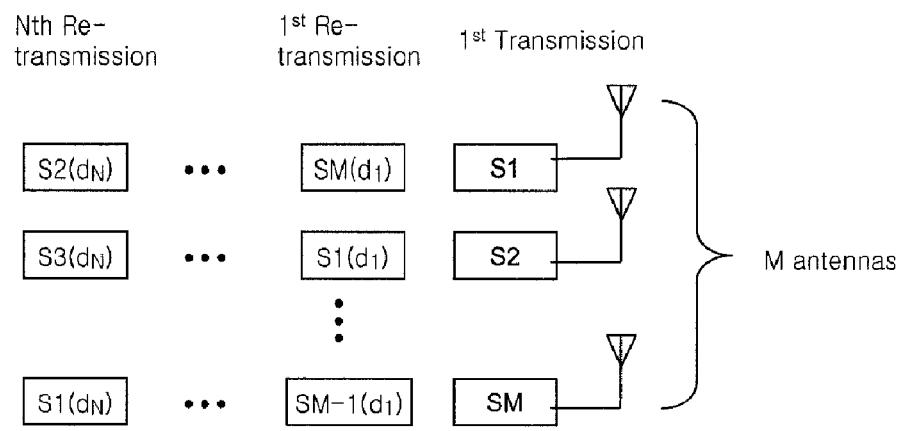

[Fig. 15]
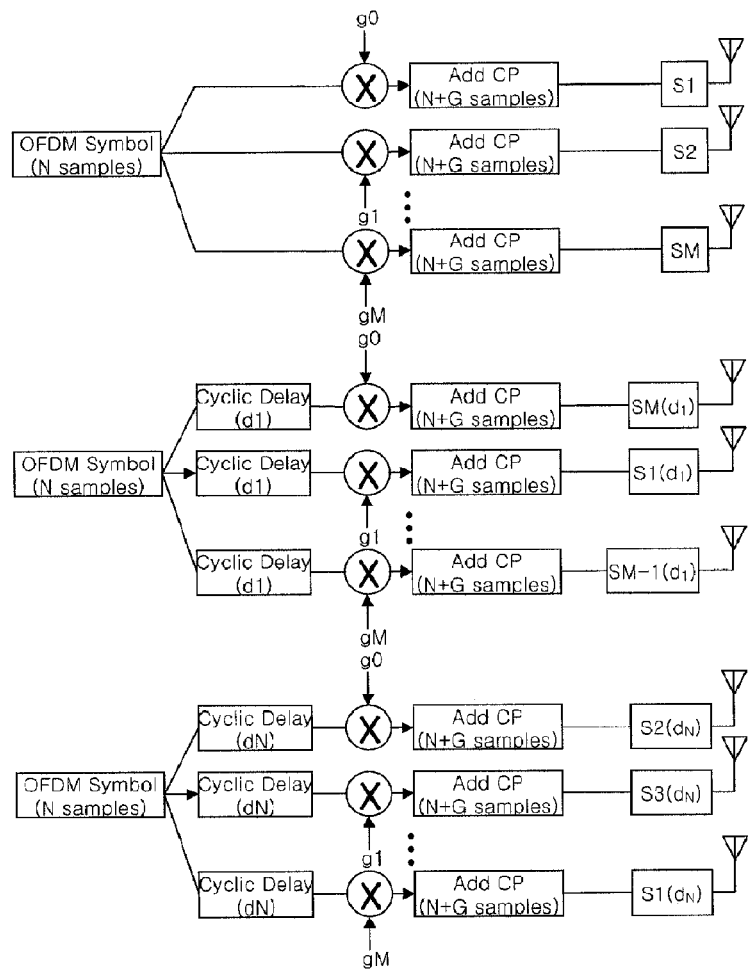
[Fig. 16]
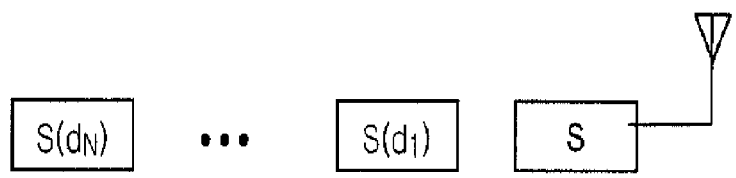
[Fig. 17]
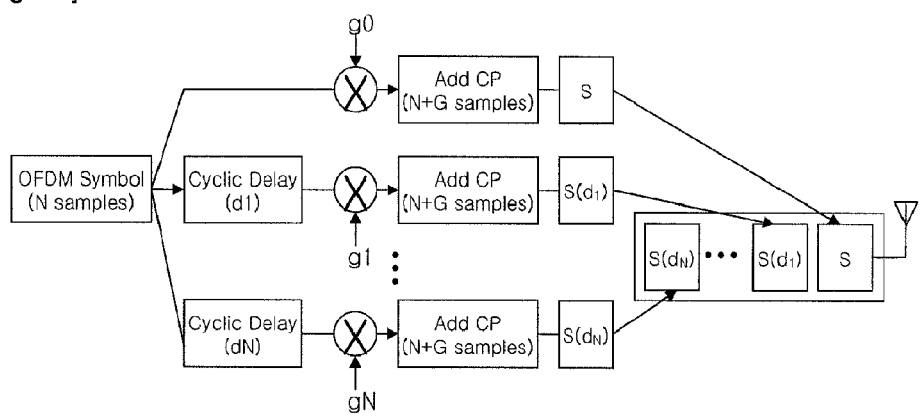

[Fig. 18]
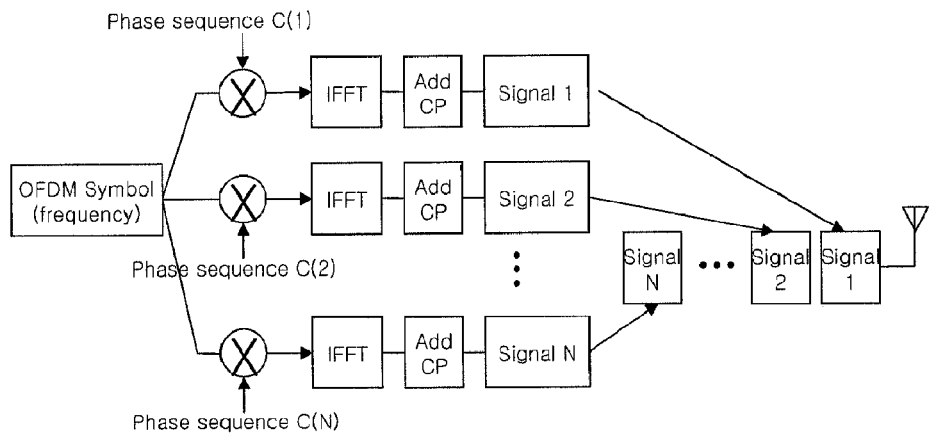
[Fig. 19]
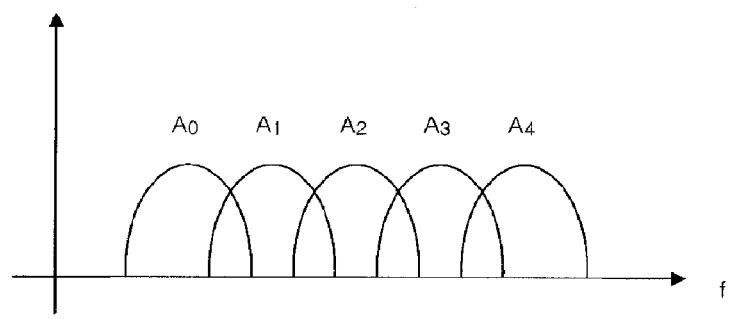
[Fig. 20]
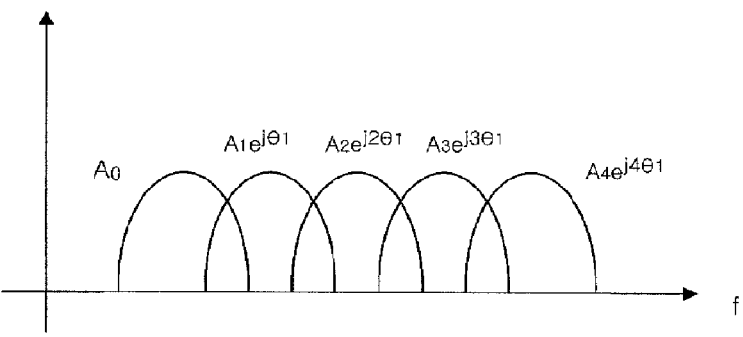
[Fig. 21]
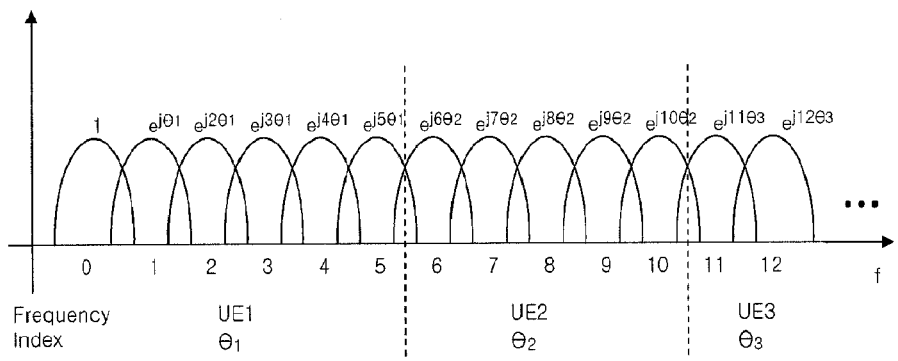

REPETITIVE TRANSMISSIONS IN MULTI-CARRIER BASED WIRELESS ACCESS TECHNIQUES

CROSS-REFERENCE TO RELATED APPLICATIONS

This application is a national stage application of International Application No. PCT/KR2007/001704, filed on Apr. 6, 2007, which claims the benefit of earlier filing date and right of priority to U.S. Provisional Application No. 60/790,972, filed on Apr. 10, 2006, and Korean Application No. 10-2006-0064452, filed on Jul. 10, 2006.

DISCLOSURE OF INVENTION

Technical Solution

This disclosure relates to repetitive transmissions in multi-carrier based wireless access techniques.

Certain multi-carrier based wireless access techniques do not adequately support a mobile communication system with various types of antenna structures.

The present inventors recognized certain problems related to certain multi-carrier based wireless access techniques. Based upon such recognition, the following features have been conceived.

The features and aspects of the present disclosure have been proposed to improve upon certain multi-carrier based wireless access techniques by providing a repetitive transmission scheme that results in additional frequency diversity gain being obtained while requiring low complexity. Such repetitive transmission scheme is applicable regardless of the number of antennas, and provides improved performance in a channel environment having low frequency selection.

FIG. 1 is a block diagram showing a structure of an Orthogonal Frequency Division Multiplexing (OFDM) system having a single transceiving antenna.

FIG. 2 is a block diagram showing a structure of an Orthogonal Frequency Division Multiplexing (OFDM) system having multiple transceiving antennas.

FIG. 3 is a block diagram showing an example of a HARQ scheme.

FIG. 4 is a block diagram showing another example of the HARQ scheme.

FIG. 5 is a block diagram showing a cyclic delay diversity scheme.

FIG. 6 is a drawing to describe a re-transmission method for a space-time coding based HARQ scheme.

FIG. 7 is a block diagram showing some concepts in applying the repetitive transmission method according to an embodiment of the present disclosure.

FIG. 8 is a block diagram showing the concept of performing re-transmissions according to the present embodiment.

FIG. 9 is a block diagram showing a scheme for performing re-transmissions.

FIG. 10 is a block diagram showing the concepts of performing re-transmissions through multiple antennas according to the present embodiment.

FIG. 11 is a block diagram showing how the re-transmission scheme is performed through multiple antennas.

FIG. 12 is a block diagram showing another concept of performing re-transmissions through multiple antennas according to the present embodiment.

FIG. 13 is a block diagram showing a scheme of performing re-transmission through multiple antennas.

FIG. 14 is a block diagram showing another concept of performing re-transmissions through multiple antennas according to the present embodiment.

FIG. 15 is a block diagram showing a scheme for performing re-transmissions through multiple antennas.

FIG. 16 is a block diagram indicating the data included in a single frame.

FIG. 17 is a block diagram indicating a method for generating the data frame of FIG. 16.

FIG. 18 is a block diagram showing how to implement a cyclic delay transmission method through frequency rotation (circular shifting).

FIGS. 19 and 20 show the changes in signal components when cyclic delay is performed.

FIG. 21 shows the changes in signal components when 3 respectively different phase sequences are multiplied to a particular signal.

Repetitive transmission schemes are essential for increasing the quality of communication systems. Many schemes employ methods for respectively increasing spatial diversity, time diversity, and frequency diversity. Among these, one of the most important methods for increasing system quality is the HARQ scheme The basic concept of the HARQ scheme is to re-transmit the same information during re-transmission if re-transmission is required due to an error occurrence in a first transmitted packet, such that time diversity gain is obtained while signal power is increased for correcting errors or such that coding gain is increased by transmitting the new parts of the parity portion for correcting packet errors.

However, despite the use of such HARQ scheme, in certain OFDM systems employing a single transceiving antenna, because there is no spatial diversity gain, even if re-transmission is performed during a low moving speed environment in which the channel changes slowly, the re-transmitted signal passing through a similar channel again, which results in a high probability that packet errors are not corrected if the channel is not good. This same drawback is suffered in a multiple transceiving antenna system without any multiple antenna schemes being applied thereto.

Additionally, when using the space-time coding based HARQ scheme, spatial diversity gain is obtained, but because the related art scheme had been designed with the assumption that the channel does not change during re-transmission, if the moving speed is high, inter-symbol interference occurs due to changes in the channel and the first transmission should be sent at a spatial multiplexing rate of 1 or above, which results in the problem of not being useful for a mobile communication system supporting various types of antenna structures.

FIG. 1 is a block diagram showing a structure of an Orthogonal Frequency Division Multiplexing (OFDM) system having a single transceiving antenna. FIG. 2 is a block diagram showing a structure of an Orthogonal Frequency Division Multiplexing (OFDM) system having multiple transceiving antennas.

User data to be transmitted to a receiving side or data bits corresponding to control data are inputted into a channel encoder 101. This channel encoder 101 attaches redundant bits to the data bits in order to reduce the effects with respect to effects or noise coming from the channel. The outputs of the channel encoder 101 are inputted into a mapper 102 and are converted into symbols. These symbols are then inputted into a serial/parallel converter 103. The serial/parallel converter 103 changes serial data into parallel data. The serial/parallel converter 103 can transmit data to a receiving side by using a plurality of orthogonal sub-carriers. If transmitting via a plurality of antennas as shown in FIG. 2, the output of the serial/parallel converter 103 is input into a multi-antenna encoder 104. The multiplex antenna encoder 104 performs space-time signal processing for converting data symbols into space-time signals. For the multi-antenna scheme, the transmitting antenna is used to transmit such space-time signal via channels, and the receiving antenna is used to receive such space-time signal from the channels. The multi-antenna decoder 105 performs re-conversion of the received space-time signals into respective data symbols.

A system, which employs one or more antennas, inputs the signal received via multiple sub-carriers into a parallel/serial converter 106, which changes parallel signals into serial signals. The output of the parallel/serial converter 106 is input into a demapper 107, which changes the data symbols into a bit sequence. For such bit sequence, the channel decoder 108 performs channel decoding with respect to channel codes in order to deduce the data.

In a system as shown in FIGS. 1 and 2, certain repetitive transmission schemes may be classified in the following manner.

Repetitive transmission schemes applicable to all systems in which if the feedback channel is available with one or multiple transceiving antennas may include Automatic Repeat Request (ARQ) schemes, Hybrid ARQ (HARQ) schemes, repetition coding schemes, etc.

The ARQ scheme employs a method in which the same signal is re-transmitted when an error occurs in the transmitted packet. The HARQ scheme employs a method in which the same signal or a different type of signal is re-transmitted when an error occurs in the transmitted packet. The repetition coding scheme employs a method in which the same signal is repeated many times and transmitted via a single packet, and such scheme is used for transmission of signals that require accurate reception, such as control signals.

Hereafter, repetitive transmission schemes applicable to only systems with multiple transceiving antennas will be explained. Such schemes may include a space-time coding scheme, a cyclic delay diversity scheme, a space-time coding based HARQ scheme, etc.

The space-time coding scheme employs a method in which the same signal is transmitted via a different transmit antenna in a subsequent time slot. The cyclic delay diversity scheme employs a method in which the same signal is transmitted by using different cyclic delays and different poser levels with respect to each antenna. The a space-time coding based HARQ scheme employs a method in which the initial transmission is performed according to a spatial multiplexing method, while re-transmissions are performed in a space-time coding manner if errors occur.

In communication systems, repetitive transmission schemes have developed in various ways in order to increase the reliability of the communications environment. Some repetitive transmission schemes described above are methods that are applicable to particular communication systems having only one transceiving antenna or multiple transceiving antennas. Such repetitive transmission schemes operate in the following manner.

The ARQ scheme is the most basic method for correcting errors when an error occurs in the transmitted packet. This is a scheme for re-transmitting a packet that is the same as the transmitted packet, whereby the receiving side discards the erroneous packet and waits for a new packet.

The HARQ scheme is a combination of the ARQ scheme with channel coding. The HARQ scheme may be generally classified into two types. The first type is a chase combining scheme as shown in FIG. 3. As shown in FIG. 3, in the chase combining type HARQ, channel coded packets are transmitted and if the first transmission failed, the same packet is transmitted during re-transmission. This is the same as the ARQ scheme, but in the chase combining HARQ scheme, erroneous packets are not discarded but stored in a buffer and later combined with a re-transmitted packet for error restoration. Thus, errors are restored by using time diversity and by increasing signal power.

FIG. 4 is a block diagram that shows another example of the HARQ scheme having an increment redundancy type structure (format). In the increment redundancy type HARQ scheme, re-transmissions are not performed in the same manner as in the initial transmission, but the effects of lowering channel coding rate while correcting errors of a packet are achieved by re-transmitting the additional parity portion of the channel code.

The repetition coding scheme employs a method in which a low channel coding rate is simply obtained by forming a single packet upon repeating the channel coded blocks and transmitting the same.

The space-time coding scheme employs a method in which spatial diversity gain is obtained by transmitting signals via a different transmit antenna with continuously sending the same signal in a multi-antenna environment. The equation below is the most basic space-time code and is typically used in a system having two transmitting antennas.

$$\left[ \frac{1}{\sqrt{2}} \begin{bmatrix} S_1 & -S_2^* \\ S_2 & S_1^* \end{bmatrix} \right]$$ [Equation 1]

In the above equation, the rows of the matrix represent the transmit antennas while the columns represent time. As shown in the above equation, the S1 data symbol is transmitted via the first antenna and then transmitted via the second antenna in the form of a conjugate complex number, and the S2 data symbol is transmitted via the second antenna and then transmitted via the first antenna in the form of a conjugate complex number of an opposite code in order to keep the orthogonal property between data symbols. By transmitting in this manner, each data symbol is transmitted trough all transmit antennas without any inter-symbol interference, thus obtaining full diversity gain.

FIG. 5 is a block diagram showing a cyclic delay diversity scheme. The cyclic delay diversity scheme is advantageous because when transmitting OFDM symbols in a system having multiple transmission antennas, as signals are transmitted via all antennas with respectively different delays and/or magnitudes, frequency diversity gain can be obtained at the receiving side upon combining each delayed signal, and the complexity of the receiver can be significantly reduced since the signals are combined and detected (extracted) per each transmission antenna.

Hereafter, the space-time coding based HARQ scheme described above will be explained. FIG. 6 is a drawing to describe a re-transmission method for a space-time coding based HARQ scheme. FIG. 6 shows a scheme of a first transmission and a second transmission upon reception of its NACK (negative acknowledgement) signal.

As in FIG. 6, in a time repetitive re-transmission method using space-time coding, space diversity gain is additionally acquired when re-transmitting such that the power of the re-transmitted signal is increased while diversity gain is also additionally obtained.

The particular characteristics and effects of the present disclosure will be specified in more detail as explained hereafter with respect to an embodiment of the present disclosure.

The present embodiment relates to a repetitive transmission method. The repetitive transmission method refers to a scheme in which particular data are transmitted a plurality of times. When data in transmitted a plurality of times according to the repetitive transmission method, the data being transmitted may be the same data or may be different data. For example, the same data may be transmitted to the receiving side over a plurality of times. Also, a plurality of same data may be transmitted during a particular single unit of time. Also, particular data may be transmitted in an initial transmission, and data resulting from the initially transmitted data having undergone certain data processing may be transmitted during a second transmission. Also, particular data may be transmitted in an initial transmission, and a portion of the initially transmitted data may be transmitted in the second transmission.

As an example of the above-described repetitive transmission method, there is a re-transmission scheme. The re-transmission scheme refers to a method where the transmitting side re-transmits data to the receiving side, if the receiving side was not able to normally reconstruct (decode) the received data. Namely, if the initial transmission failed, a re-transmission is performed. The data being transmitted through such re-transmission may be the same data as the initially transmitted data, or may be data resulting from the initially transmitted data having undergone particular data processing, or may be a portion of the initially transmitted data.

FIG. 7 is a block diagram showing some concepts in applying the repetitive transmission method according to an embodiment of the present disclosure. FIG. 7 is used to describe the most general concepts of the exemplary embodiment.

The example in FIG. 7 shows a repetitive transmission scheme for signals having cyclic delay performed thereto in the time domain with respect to OFDM symbols. This cyclic delay is conceptually the same as a cyclic shift, whereby a sample included in an OFDM symbol is cyclically delayed for a particular number of times. The OFDM symbol refers to a set of data that has been processed using IFFT inverse Fast Fourier Transform) or IDFT Inverse Discrete Fourier Transform) operations, and has the characteristic of being typically transmitted during the same time period. The above-mentioned sample refers to the data included in each OFDM symbol, and corresponds to user data or control signals. FIG. 7 shows an example where a single OFDM symbol includes N samples, and N may be equivalent to the number of subcarriers used for communication.

In FIG. 7, the OFDM symbol refers to an OFDM symbol that has undergone IFFT or IDFT operations. Namely, the cyclic delay of FIG. 7 shows an OFDM symbol (having undergone IFFT or IDFT operations) being cyclically delayed by as much as a particular sample in the time domain.

FIG. 7 shows an example of transmitting an N number of data streams. For each data stream, a cyclic delay with a respectively different delay value is applied. Namely, a delay of '0' is applied to a first data stream corresponding to data 's', and a power of g0 is provided. Also, a delay of '$d_1$' is applied to a second data stream corresponding to data '$s(d_1)$', and a power of g1 is provided. Also, a delay of '$d_N$' is applied to an N-th data stream corresponding to data '$s(d_N)$', and a power of gN is provided. Such first through N-th data streams may be transmitted via the antennas upon inserting a cyclic prefix (CP) that equals a certain G number of samples.

In the example of FIG. 7, an N number of respectively different cyclic delays may be applied. Also, an N number of respectively different power controls may be performed. If the transmissions for a single user are problematic, various cyclic delays or various power controls may be performed according to the changing channel environment. Also, if re-transmissions are problematic, various cyclic delays or various power controls may be performed according to the number of re-transmission occurrences. Also, if transmissions for multiple users are problematic, various cyclic delays or various power controls that are optimized for each user may be performed. As described above, it is preferable that the cyclic delay or power control values are changed according to various communication environments. In order to adjust the cyclic delay or power control values in a more active manner, it is more preferably that information fed back from the receiving side is used. Namely, the values d1 through dN or the values g0 through gN can be controlled by using feedback information from the receiving side.

In the example of FIG. 7, the number of antennas is not limited, and various antenna schemes may be applicable. More details regarding such application methods are described below.

In the example of FIG. 7, the data 's' through 's(dN)' may be included in a single data frame or in multiple data frames, and the detailed methods therefor are explained below.

In the example of FIG. 7, the data 's' through '$s(d_N)$' may be re-transmission signals in accordance with ACK/NACK signals transmitted from the receiving side, and the detailed re-transmission method therefor is explained below.

In the example of FIG. 7 may be summarized as follows. The basic concept of a method using cyclic delay diversity for a time repetitive signal that is proposed in this exemplary embodiment is shown in FIG. 7. Namely, when transmitting a time repetitive transmission signal as in FIG. 7, it is preferably that each of the repeated signals has the same or different powers, while having different cyclic delays.

Hereafter, the re-transmission method according to the present embodiment will be explained with reference to FIGS. 8 and 9.

FIG. 8 is a block diagram showing the concept of performing re-transmissions according to the present embodiment. FIG. 9 is a block diagram showing a scheme for performing re-transmissions.

As shown in FIGS. 8 and 9, data 's' that has not undergone cyclic delay is transmitted in a first transmission, while data '$s(d_1)$' that has undergone cyclic delay amounting to d1 is transmitted in a first re-transmission. Such re-transmission is preferably performed when a NACK signal is received. Such retransmission may be repeated N times, and if repeated N times, it is preferably that the cyclic delay is performed according to at least N respectively different cyclic delay values. By the N-th re-transmission, $s(d_N)$ that has been cyclic delayed by $d_N$ is transmitted.

For re-transmission, it is preferable that power control is performed. Such power control is performed according to g0 through gN of FIG. 9.

The present embodiment in which cyclic delay diversity is used for the time repetitive signal can be applied to any scheme that performs repeated transmissions according to time.

When the present embodiment is applied to the HARQ scheme or the repetition code scheme, frequency diversity gain can be increased when compared to the related art methods.

Also, during re-transmissions, regardless of whether the same or different channels are employed, frequency selectivity can be adjusted by using various power values and delay values, and thus, frequency diversity gain of a high magnitude can be obtained in any situation.

As in FIGS. 8 and 9, if signals are re-transmitted, the receiving side recognized each signal as a multi-path signal, and simple detection thereof is possible and because frequency selectivity can be increased, the overall system performance can be improved.

As described above, the present embodiment supports various systems having various numbers of transceiving antennas.

Hereafter, the re-transmission method according to the present embodiment will be explained by example of application to a multiple antenna system.

FIG. 10 is a block diagram showing the concepts of performing re-transmissions through multiple antennas according to the present embodiment. FIG. 11 is a block diagram showing how the re-transmission scheme is performed through multiple antennas.

The example of FIG. 10 relates to performing re-transmissions through respectively different antennas. Namely, the first transmission is performed through a first antenna, the first re-transmission is performed through a second antenna, and the second re-transmission is performed through a third antenna. Also, the first transmission is to transmit transmission data 's' that has not undergone any cyclic delay, the first re-transmission is to transmit transmission data $s(d_1)$ that has undergone a cyclic delay of d1, and the second re-transmission is to transmit transmission data $s(d_2)$ that has undergone a cyclic delay of $d_2$.

The example of FIG. 11 shows an example that applies the concept of FIG. 10. As shown, re-transmission can be performed for a maximum of N times, and each of the re-transmitted data can be transmitted through respectively different antennas. The example of FIG. 11 shows when an N number of antennas are used with respect to an N number of re-transmissions, but the total number of antennas are not limited to such. For example, when there are 4 re-transmissions and 2 transmit antennas, a possible transmission scheme would be that the 1st and 3rd re-transmissions go through the 1st antenna, while the 2nd and 4th re-transmissions go through the 2nd antenna.

The example of FIG. 11 shows when certain power control is performed for the data being re-transmitted. As described above, the power control or cyclic delay may be based upon information being fed back from the receiving side.

When the re-transmission method of 10 and 11 are employed, respectively different channels are established per each antenna, and space diversity gain as well as frequency diversity gain can be obtained. Re-transmissions can also be performed in a manner other than those shown in FIGS. 10 and 11.

Namely, among the multiple antenna schemes, a spatial multiplexing scheme that increases system capacity by obtaining spatial multiplexing gain can be applied. An example thereof is shown in FIGS. 12 and 13.

FIG. 12 is a block diagram showing another concept of performing re-transmissions through multiple antennas according to the present embodiment. FIG. 13 is a block diagram showing a scheme of performing re-transmission through multiple antennas.

FIG. 12, unlike the examples of FIGS. 10 and 11, shows an example where data re-transmissions are performed at all of the multiple antennas. In FIG. 12, S1, S2, ..., SM are respectively different OFDM signals. For example, the signals S1 through SM may be independent OFDM signals, or may be signals for respectively different M users. In the example of FIG. 12, the 1st antenna through the M-th antenna each transmit particular data. For example, the 1st antenna is used for re-transmissions related to S1, the 2nd antenna is used for re-transmissions related to S2, and the M-th antenna is used for re-transmissions related to SM.

As shown in FIG. 13, data S1 through SM that have not undergone any cyclic delay can be transmitted in a first data transmission. If a first re-transmission is performed thereon, a cyclic delay due to a particular cyclic delay value (d1) may be performed for each of the data S1 through SM.

As shown, when the first transmission or a re-transmission thereof is performed, power control may be performed upon determining the g0 through gM values according to control information such as channel environment at the like. Also, when performing the N-th data transmission, the data having undergone a cyclic delay by an amount of dN as shown in the drawings, can be transmitted through the multiple antennas.

If a time-based antenna rotation scheme is applied to the scheme of FIG. 12, data can be repetitively transmitted as in the method of FIGS. 14 and 15.

FIG. 14 is a block diagram showing another concept of performing re-transmissions through multiple antennas according to the present embodiment. FIG. 15 is a block diagram showing a scheme for performing re-transmissions through multiple antennas.

FIG. 14 shows an example in which data re-transmissions are performed at all of the multiple antennas. In FIG. 14, S1, S2, ..., SM are respectively different OFDM signals. In FIG. 14, if particular data S1 was transmitted through any one among the multiple antennas, thereafter, other data excluding S1 are then transmitted. For example, for the 1st antenna, after S1 is transmitted, S2 data is transmitted instead of S1, then S3 data and the like may be transmitted thereafter. Also, because particular data is transmitted by multiple antennas, the data S1 through SM are thus transmitted to the receiving side at a particular time.

As shown in FIG. 15, in the first data transmission, the data S1 through SM that have not undergone any cyclic delay can be transmitted. When performing a first re-transmission thereof, a cyclic delay based upon a particular cyclic delay value ($d_1$) may be performed for each data S1 through SM. Here, the 1st antenna that transmitted S1 then transmits SM($d_1$) instead of S1($d_1$) in order to ally an antenna rotation scheme. Also, the 2nd antenna that transmitted S2 then transmits S1($d_1$) instead of S2($d_1$) in order to apply an antenna rotation scheme. Also, the M-th antenna that transmitted SM then transmits SM-1($d_1$) instead of SM($d_1$) in order to apply an antenna rotation scheme.

As shown, in the first transmission or in performing its related re-transmission, power control may be performed by determining the g0 through gM value according to control information, such as the channel environment, etc. Also, when performing the N-th data transmission, the data having undergone cyclic delay (by an amount of dN as depicted) may be transmitted through multiple antennas.

As in FIGS. 14 and 15, if transmissions are performed upon changing the transmit antenna of each signal according to time, spatial diversity gain can be additionally utilized.

As described above, in the examples in FIGS. 12 and 14, respectively different cyclic delays and respectively different power controls may be performed. Also, unlike what is depicted in FIGS. 12 and 14, only the signals having error occurrences could be re-transmitted. Also, for re-transmission, each cyclic delay value and power value may be received from the receiver as feedback information, or the transmitter may amply appropriate values therefor.

A method applicable to the cyclic delay diversity scheme that proposes repetition coding may be achieved according to the examples of FIGS. 16 and 17.

FIG. 16 is a block diagram indicating the data included in a single frame. FIG. 17 is a block diagram indicating a method for generating the data frame of FIG. 16.

Repetition coding is a scheme that repeats the same data and included such into a single frame. As the same data is repeated, the effect of lowering the coding rate upon transmission is created and as a result, the effect of performing accurate data transmissions is created.

The repetition coding method according to the present embodiment can generate the data shown in FIG. 16. Namely, a data block including values that have undergone respectively different cyclic delays with respect to the same data is generated and transmitted to the receiving side.

The example of FIG. 17 depicts a method of generating the data of FIG. 16. FIG. 17 shows an example in which data S that has not undergone any cyclic delay with respect to the same data S, data $S(d_1)$ that has undergone cyclic delay according to a particular delay value $d_1$, and data $S(d_N)$ that has undergone cyclic delay according to a particular delay value dN are included in a single frame.

According to the examples of FIGS. 16 and 17, OFDM symbols that have undergone cyclic delays in a sequential manner are transmitted N times, which is the number of times of repetition. Upon such repetition coding transmission, the receiving side can obtain signal power as sell as additional frequency diversity gain, and thus high performance can be obtained.

Such repetition coding method can be performed in the time domain or the frequency domain. The examples of FIGS. 7 through 17 refer to performing cyclic delays upon cycling samples in the time domain, but this is merely exemplary, as the same effect as performing cyclic delay on samples in the time domain may also be obtained by allocating a phase sequence in the frequency domain. The cyclic delay method employed in the repetition signal transmission scheme proposed in the present embodiments are not intended to be limited to any particular methods, and thus methods for performing cyclic delays through operations in the frequency domain are also within the scope of the present disclosure.

Hereafter, a method of transmitting signals in a cyclic delay manner through operations in the frequency domain will be described.

FIG. 18 is a block diagram showing how to implement a cyclic delay transmission method through frequency rotation (circular shifting).

In a multi-carrier system such as OFDM, SC-FDMA, etc., an IFFT operation (or an equivalent IDFT operation) is performed according to the number of sub-carriers used for data transmission. The cyclic delay transmission method may be achieved by a scheme of performing circular shifting (a particular number of times) on the samples included within the OFDM symbol in the time domain after the IFFT operation is performed, or by a scheme of applying particular phase components with respect to frequency components prior to performing the IFFT operation. Namely, before the IFFT operation are performed, the cyclic delay scheme may be implemented through frequency circular shifting.

As shown in FIG. 18, when a certain phase sequence is multiplied to a signal before performing the IFFT operation, the same effect as a cyclic delay in the time domain is generated.

FIGS. 19 and 20 show the changes in signal components when cyclic delay is performed.

FIG. 19 shows the original signal components before cyclic delay is performed. If the original signal undergoes cyclic delay in the time domain by an amount equaling to a certain cyclic delay value $d_1$, the signal components of the original signal then change to those shown in FIG. 20. Namely, upon performing a time delay amounting to d1, the same effect as performing phase rotation (circular shifting) due to a certain θ1 corresponding to d1 is generated. Namely, performing a time delay of d1 in the time domain and applying a certain component to each sub-carrier in the frequency domain result in the same effects.

In summary, cyclic delay may be performed by multiplying a particular phase sequence $C_1$ to the signal of FIG. 19, and such phase sequence $C_1$ may be as shown in the following equation 2.

$$[C_1 = [1, e^{j1\theta_1}, e^{j2\theta_1}, e^{j3\theta_1}, \ldots, e^{j(N-2)\theta_1}, e^{j(N-1)\theta_2}]] \quad \text{[Equation 2]}$$

FIG. 21 shows the changes in signal components when 3 respectively different phase sequences are multiplied to a particular signal.

FIG. 21 shows the case where a certain phase sequence C(1) is multiplied to a signal corresponding to a frequency index of 1 through 5, a certain phase sequence C(2) is multiplied to a signal corresponding to a frequency index of 6 through 10, and a certain phase sequence C(3) is multiplied to a signal corresponding to a frequency index of 11 or above. The frequency index 1 through 5 may be for a signal of a particular user 1 (UE1), and a particular phase value $\theta_1$ may be multiplied to the user 1. As depicted, the value that has undergone cyclic delay can have various phases. When a signal that has undergone cyclic delay through a single antenna or multiple antennas is transmitted, the magnitude of the signal may change according to the respectively different phase values. In particular, when cyclic delay is applied to a signal that has undergone channel coding, an advantage that is obtained in that the selectivity at the receiving side is improved according to changes in signal magnitude.

The present embodiment provides a repetitive signal transmission method with improved performance through cyclic delays in the time domain or through phase rotations (circular shifting) in the frequency domain.

The signal repetitive transmission method using a cyclic delay scheme as proposed by the present disclosure applies cyclic delays to transmit a signal for re-transmission or repetitive transmission. Accordingly, the receiving side detects these transmitted signals upon combining thereof, and frequency diversity gain is obtained by increasing frequency selectivity.

The present disclosure is applicable to any signal that is repeated in time, and in an OFDM system having multiple transceiving antennas, additional spatial diversity gain can be obtained by performing transmissions in various forms.

As a result, additional frequency diversity gain can be obtained by the features described herein that require low complexity.

The concepts of the present disclosure may be related to Cyclic Shift Transmit Diversity (CSTD), which is an adaptation of the idea of delay diversity to OFDM systems. With CSTD, each antenna element in a transmit array sends a circularly shifted version of the same OFDM time domain symbol. Here, each antenna adds a cyclic prefix after circularly shifting the OFDM symbol, and thus the delay-spread protection offered by the cyclic prefix is unaffected by the CSTD.

The present disclosure provides a method for repetitive transmission using a plurality of carriers, the method comprising: preparing a plurality of cyclic delays that can be applied to a plurality of carriers; performing cyclic delays based upon the number of repetitions for repetitive transmission of data symbols to be transmitted to at least one receiving side; and transmitting the cyclic delayed data symbols using the plurality of carriers. The transmitting step may comprise: repetitively transmitting the cyclic delayed data symbols in a sequential manner in accordance with a reception of a negative-acknowledgement signal from the receiving side. The transmitting step may be performed through a plurality of antennas. The transmitting step may be performed through a single antenna. A transmitting side of the data symbols respectively transmitted by the plurality of antennas may be fixed. A transmitting side of the data symbols respectively transmitted by the plurality of antennas may change according to the number of repetitions. The transmitting step may be performed by including the cyclic delayed data symbols into a single frame.

Also, the present disclosure provides a method of repetitive transmissions in multi-carrier based wireless access techniques, the method comprising: providing multiple cyclic delay values for a plurality of carriers; performing a cyclic delay procedure using the multiple cyclic delay values according to the number of repetitive transmission of data symbols to be transmitted to a receiver; and transmitting the cyclic delayed data symbols to the receiver using the plurality of carriers. The transmitting step may comprise: repetitively transmitting the cyclic delayed data symbols in a sequential manner in accordance with feedback information from the receiver. The transmitting step may be performed via multiple antennas. The transmitting step may be performed via a single antenna. The data symbols may be respectively transmitted via the multiple antennas of a transmitter that is stationary. The data symbols may be respectively transmitted via the multiple antennas of a transmitter that changes according to the number of repetitions. The transmitting step may be performed upon inserting the cyclic delayed data symbols into one data frame.

Additionally, the present disclosure provides an apparatus for performing repetitive transmissions in multi-carrier based wireless access techniques, the apparatus comprising: a processor adapted to provide multiple cyclic delay values for a plurality of carriers and to perform a cyclic delay procedure using the multiple cyclic delay values according to the number of repetitive transmission of data symbols to be transmitted to a receiver; and a transmitter cooperating with the processor and adapted to transmit the cyclic delayed data symbols to the receiver using the plurality of carriers.

The features and aspects described herein are related to and can be implemented for various types of communication techniques (such as, but not limited to, broadband wireless air interface techniques, Multiple-Input Multiple-Output (MIMO) techniques, so-called 3.5 G or 4 G systems designed to provide higher data rates and F-based data services, etc.) and/or various communication standards (such as, but not limited to, OFDM, OFDMA, 3GPP HSDPA, WCDMA, UMTS, IEEE 802.11n, IEEE 802.16, etc.). As such, at least some of the features described herein are applicable to such standards that have been developed or that are continuing to evolve.

It should also be understood that the above-described exemplary embodiments are not limited by any of the details of the foregoing description, unless otherwise specified, but rather should be construed broadly. Any structural and/or functional changes and modifications that fall within the metes and bounds of the claims or equivalents of such metes and bounds are therefore intended to be embraced by such claims.

The invention claimed is:

1. A method for repetitive transmission using a plurality of carriers, the method comprising:
preparing a plurality of cyclic delays that can be applied to a plurality of carriers;
performing cyclic delays based upon the number of repetitions for repetitive transmission of data symbols to be transmitted to at least one receiving side; and
transmitting the cyclic delayed data symbols using the plurality of carriers.

2. The method of claim 1, wherein the transmitting step comprises:
repetitively transmitting the cyclic delayed data symbols in a sequential manner in accordance with a reception of a negative acknowledgement signal from the receiving side.

3. The method of claim 1, wherein the transmitting step is performed through a plurality of antennas.

4. The method of claim 3, wherein a transmitting side of the data symbols respectively transmitted by the plurality of antennas is fixed.

5. The method of claim 3, wherein a transmitting side of the data symbols respectively transmitted by the plurality of antennas changes according to the number of repetitions.

6. The method of claim 1, wherein the transmitting step is performed through a single antenna.

7. The method of claim 1, wherein the transmitting step is performed by including the cyclic delayed data symbols into a single frame.

8. A method of repetitive transmissions in multi-carrier based wireless access techniques, the method comprising:
providing multiple cyclic delay values for a plurality of carriers;
performing a cyclic delay procedure using the multiple cyclic delay values according to the number of repetitive transmission of data symbols to be transmitted to a receiver; and
transmitting the cyclic delayed data symbols to the receiver using the plurality of carriers.

9. The method of claim 8, wherein the transmitting step comprises:
repetitively transmitting the cyclic delayed data symbols in a sequential manner in accordance with feedback information from the receiver.

10. The method of claim 8, wherein the transmitting step is performed via multiple antennas.

11. The method of claim 10, wherein the data symbols are respectively transmitted via the multiple antennas of a transmitter that is stationary.

12. The method of claim 10, wherein the data symbols are respectively transmitted via the multiple antennas of a transmitter that changes according to the number of repetitions.

13. The method of claim 8, wherein the transmitting step is performed via a single antenna.

14. The method of claim 8, wherein the transmitting step is performed upon inserting the cyclic delayed data symbols into one data frame.

15. An apparatus for performing repetitive transmissions in multi-carrier based wireless access techniques, the apparatus comprising:
a processor adapted to provide multiple cyclic delay values for a plurality of carriers and to perform a cyclic delay procedure using the multiple cyclic delay values according to the number of repetitive transmission of data symbols to be transmitted to a receiver; and
a transmitter cooperating with the processor and adapted to transmit the cyclic delayed data symbols to the receiver using the plurality of carriers.

* * * * *